United States Patent
Zou et al.

(10) Patent No.: US 8,668,756 B2
(45) Date of Patent: Mar. 11, 2014

(54) PANEL FILTER WITH REDUCED RESTRICTION

(75) Inventors: Jing Zou, Wuhan (CN); Jianhua Wang, Pudong (CN); Kaarthik Venkataraman, Stoughton, WI (US); Cara R. Kazda, Stoughton, WI (US); John C. Lukasavitz, Flushing, MI (US); Robert A. Bannister, Stoughton, WI (US); Orvin D. Kendall, Cambridge, WI (US); Scott W. Schwartz, Cottage Grove, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 0 days.

(21) Appl. No.: 13/002,863

(22) PCT Filed: Oct. 27, 2010

(86) PCT No.: PCT/CN2010/078173
§ 371 (c)(1),
(2), (4) Date: Jan. 6, 2011

(87) PCT Pub. No.: WO2012/055102
PCT Pub. Date: May 3, 2012

(65) Prior Publication Data
US 2013/0199143 A1   Aug. 8, 2013

(51) Int. Cl.
*B01D 46/00*   (2006.01)

(52) U.S. Cl.
USPC .................. 55/503; 55/490; 55/495; 55/502; 55/511; 55/529

(58) Field of Classification Search
USPC ........ 55/385.3, 490, 495, 497, 502, 503, 511, 55/529; 123/198 E
See application file for complete search history.

(56) References Cited

U.S. PATENT DOCUMENTS

| | | | |
|---|---|---|---|
| 3,693,410 A * | 9/1972 | Robrecht et al. | 73/28.01 |
| 3,772,858 A * | 11/1973 | Klugman | 55/503 |
| 4,713,097 A * | 12/1987 | Grawi et al. | 96/380 |
| 4,826,517 A * | 5/1989 | Norman | 55/418 |
| 4,861,359 A * | 8/1989 | Tettman | 55/419 |
| 5,120,334 A * | 6/1992 | Cooper | 96/422 |
| 6,375,700 B1 | 4/2002 | Jaroszczyk et al. | |
| 6,387,143 B1 * | 5/2002 | Adiletta | 55/497 |
| 6,409,784 B1 * | 6/2002 | Wehr | 55/385.3 |
| 6,422,197 B1 * | 7/2002 | Amann et al. | 123/198 E |
| 6,482,247 B2 | 11/2002 | Jaroszczyk et al. | |
| 7,314,558 B1 | 1/2008 | Jaroszczyk et al. | |
| 7,323,106 B2 | 1/2008 | Jaroszczyk et al. | |
| 7,507,279 B2 | 3/2009 | Mizutani et al. | |

(Continued)

FOREIGN PATENT DOCUMENTS

| | | |
|---|---|---|
| CN | 101338712 | 1/2009 |
| CN | 201228601 | 4/2009 |
| JP | 2002-266715 | 9/2002 |

OTHER PUBLICATIONS

International Preliminary Report on Patentability, PCT/CN2010/078173, date of mailing May 10, 2013.

*Primary Examiner* — Robert Clemente
(74) *Attorney, Agent, or Firm* — Foley & Lardner LLP (57) ABSTRACT

A filter assembly, panel filter element, and servicing method is provided for reducing inlet flow restriction from a housing inlet into an inlet plenum and reducing outlet flow restriction from an outlet plenum to a housing outlet.

17 Claims, 9 Drawing Sheets

(56) References Cited

U.S. PATENT DOCUMENTS

| | | |
|---|---|---|
| 7,540,895 B2 | 6/2009 | Furseth et al. |
| 7,582,130 B2 | 9/2009 | Ng et al. |
| 7,799,108 B2 | 9/2010 | Connor et al. |
| 7,828,869 B1 | 11/2010 | Parikh et al. |
| 8,298,308 B2 * | 10/2012 | Li .............................. 55/385.3 |
| 2001/0049963 A1 | 12/2001 | Berry, III et al. |
| 2008/0047240 A1 * | 2/2008 | Trautmann et al. .......... 55/385.3 |
| 2009/0126324 A1 | 5/2009 | Smith et al. |

* cited by examiner

FIG. 21 ial direction. In FIGS. 6-8, interface split line 62a extends parallel to the noted

PANEL FILTER WITH REDUCED RESTRICTION

BACKGROUND AND SUMMARY

The invention relates to panel filters.

Panel filters are known in the prior art. Fluid to be filtered typically flows from an inlet then transversely through the panel filter element then to an outlet.

The present invention arose during continuing development efforts in panel filter technology.

DETAILED DESCRIPTION

Figure 1:
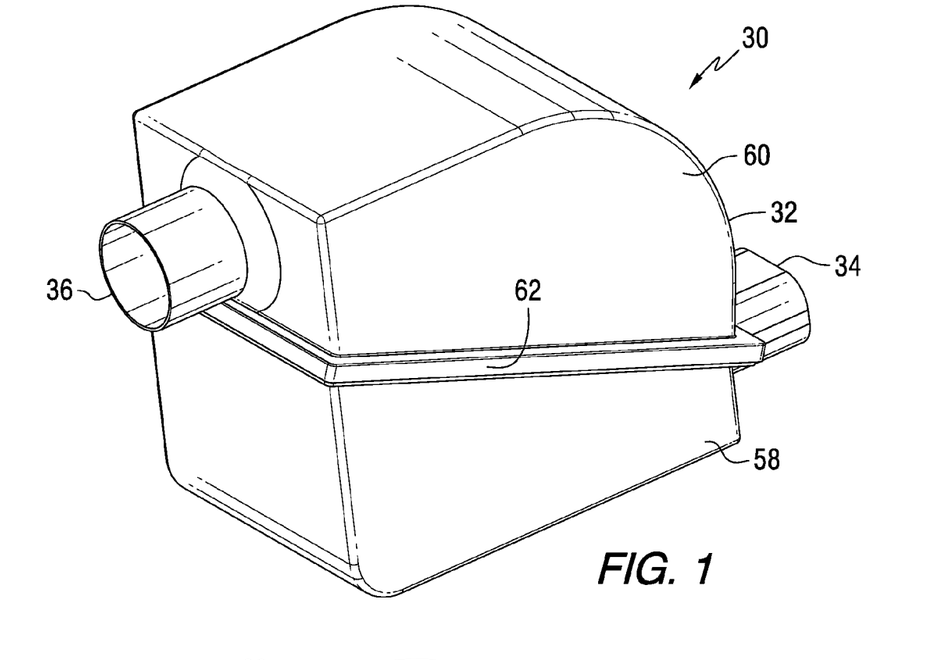
FIG. 1 is an isometric view of a filter assembly in accordance with the invention.
Figure 2:
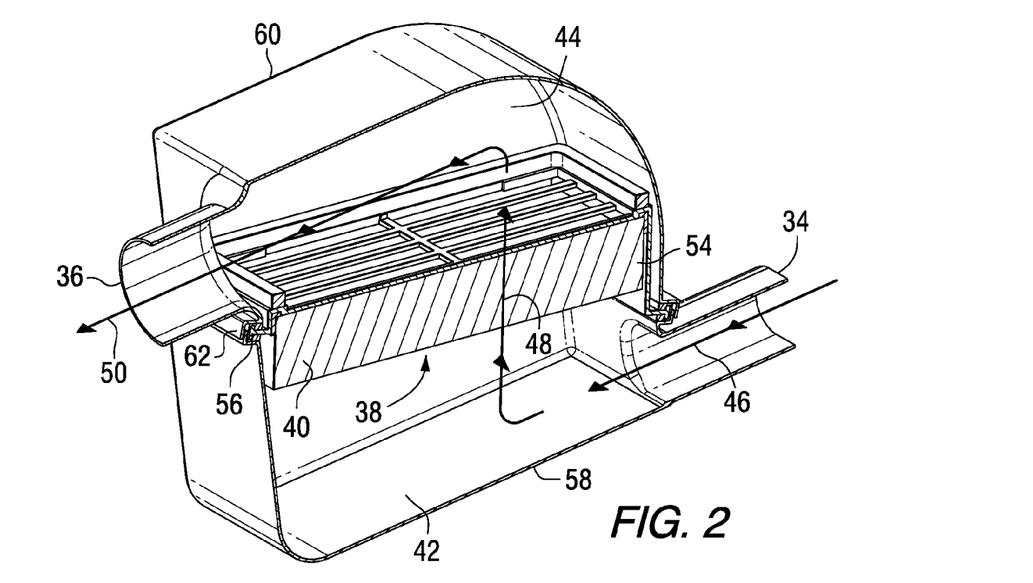
FIG. 2 is like FIG. 1 but is partially cut-away.
Figure 3:
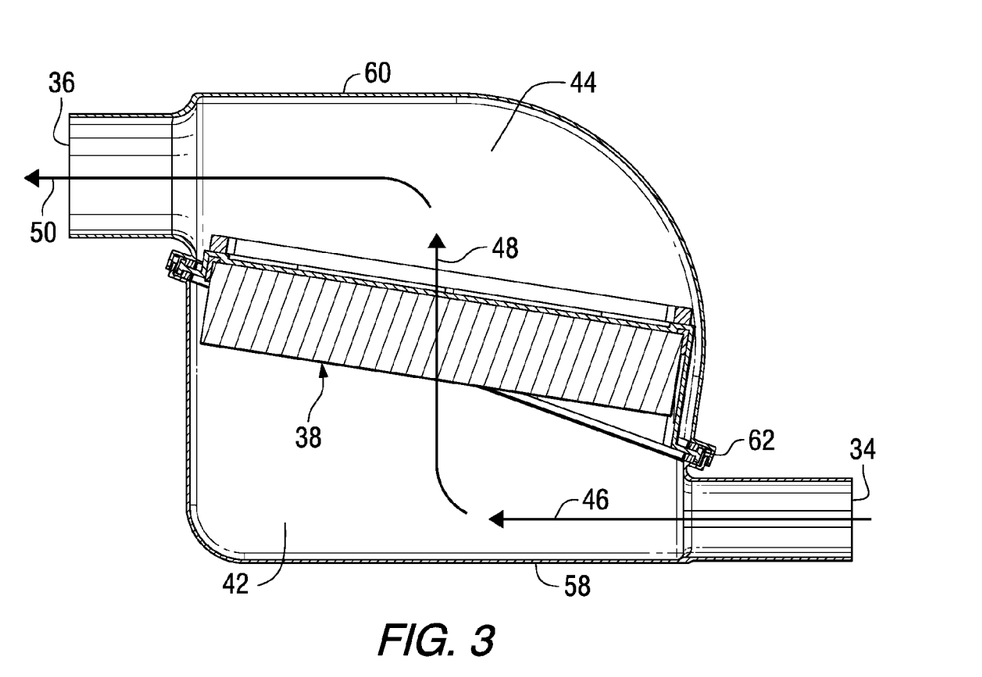
FIG. 3 is a sectional view of the filter assembly of FIG. 1.

FIGS. 1-5 show a filter assembly 30 including a housing 32 having an inlet 34 and an outlet 36, and a panel filter element 38 including filter media 40 in the housing for filtering fluid flowing from inlet 34 to outlet 36. Panel filter element 38 divides the housing into an inlet plenum 42 and an outlet plenum 44. Panel filter element 38 is configured to a) reduce inlet flow restriction from inlet 34 into inlet plenum 42 and b) reduce outlet flow restriction from outlet plenum 44 to outlet 36. As seen in FIG. 3, panel filter element 38 is positioned so as to not block nor obstruct inlet fluid flow from inlet 34 into inlet plenum 42, and is also positioned so as to not block nor obstruct outlet fluid flow from outlet plenum 44 to outlet 36. The panel filter element is further configured and positioned to increase void space in inlet plenum 42 and to increase void space in outlet plenum 44.

In an air filter implementation, optimized or maximized upstream inlet volume in inlet plenum 42 is desired for improved dirt distribution to panel air filter element 38. In some automotive air filter applications, optimized and maximized downstream volume in outlet plenum 44 is desired for improved performance of the MAFS (mass air flow sensor) downstream thereof. Void space and open volume prior to the MAFS is significant in affording consistent MAFS performance as the panel air filter element loads with time, i.e. clean to dirty. In various vehicle packaging environments, void space in the housing is minimal, or is only available in locations which are not useful. The disclosed combination desirably lowers restriction through the air intake system in an automotive application, including both the inlet into the inlet plenum and the outlet from the outlet plenum.

In FIG. 2, fluid flows along a rectilinear inlet fluid flow path 46 through housing inlet 34 into inlet plenum 42 without intercepting panel filter element 38, and then turns from rectilinear inlet fluid flow path 46 to flow through panel filter element 38 as shown at arrow 48, and then turns and flows along a rectilinear outlet fluid flow path 50 through housing outlet 36 from outlet plenum 44 without intercepting panel filter element 38. In an alternate or additional fluid flow description, fluid flows axially into the housing along a first axial flow direction at 46 through inlet 34, and then transversely as shown at arrow 48 through panel filter element 38, and then axially out of the housing along a second axial flow direction at 50 through outlet 36. In the embodiment shown, fluid flows along an axial flow direction in each of plenums 42 and 44, though other flow directions are possible. Fluid flows transversely as shown at arrow 48 through panel filter element 38 from inlet plenum 42 to outlet plenum 44. Inlet plenum 42 and outlet plenum 44 are transversely spaced on opposite sides of panel filter element 38 which is transversely placed therebetween. Panel filter element 38 extends obliquely relative to the noted axial flow direction. The volume of inlet plenum 42 increases as fluid progresses away from inlet 34, i.e. flows leftwardly therefrom in FIGS. 2 and 3, and the volume of outlet plenum 44 decreases as fluid progresses towards outlet 36, i.e. flows leftwardly in FIGS. 2 and 3.

FIGS. 6-10 show another embodiment and use like reference numerals from above where appropriate to facilitate understanding. In this embodiment, the volume of inlet plenum 42 decreases as fluid progresses away from inlet 34, i.e. moves leftwardly in FIGS. 7 and 8, and the volume of outlet plenum 44 increases as fluid progresses towards outlet 36, i.e. moves leftwardly in FIGS. 7 and 8.

Figure 4:
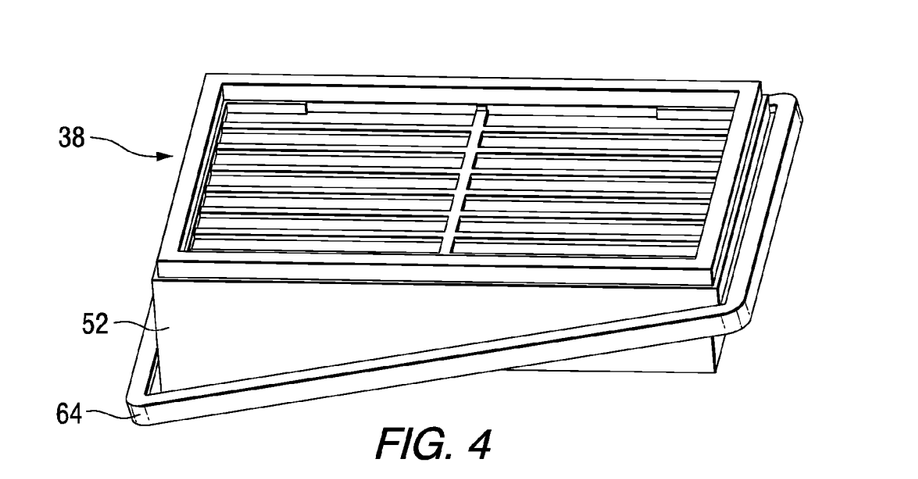
FIG. 4 is an isometric view of the panel filter element assembly mounted in the filter housing of FIG. 1.
Figure 5:
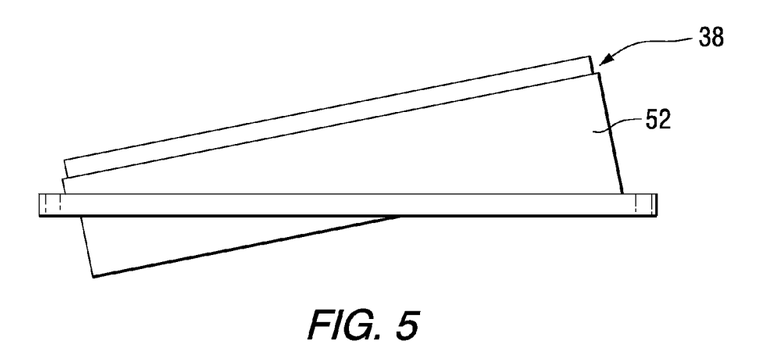
FIG. 5 is a side view of the panel filter element assembly of FIG. 4.
Figure 7:
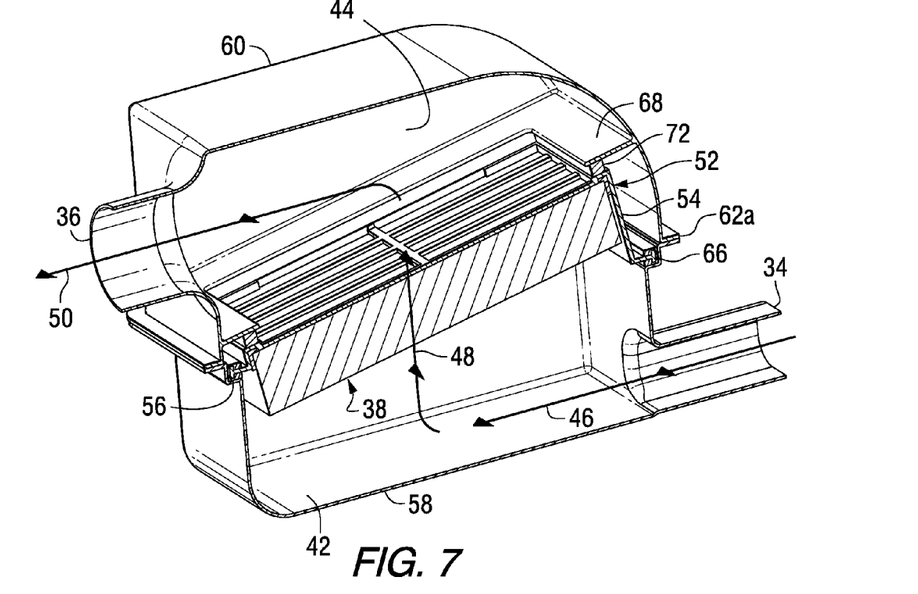
FIG. 7 is a cut-away view of the filter assembly of FIG. 6.

Panel filter element 38 has a border frame 52, FIGS. 4, 5, having distally opposite first and second endwalls 54 and 56, FIG. 2. First endwall 54 is proximate inlet 34. Second endwall 56 is proximate outlet 36. Each endwall has a height extending along the direction of fluid flow through panel filter element 38, as shown at arrow 48. The height of the first endwall is different than the height of the second endwall. In the embodiment of FIGS. 2 and 7, the height of first endwall 54 is greater than the height of second endwall 56. Panel filter element 38 has a height along the direction of fluid flow therethrough, i.e. as shown at arrow 48. The height of first endwall 54 is greater than the height of the panel filter element, and the height of second endwall 56 is less than the height of the panel filter element.

Figure 6:
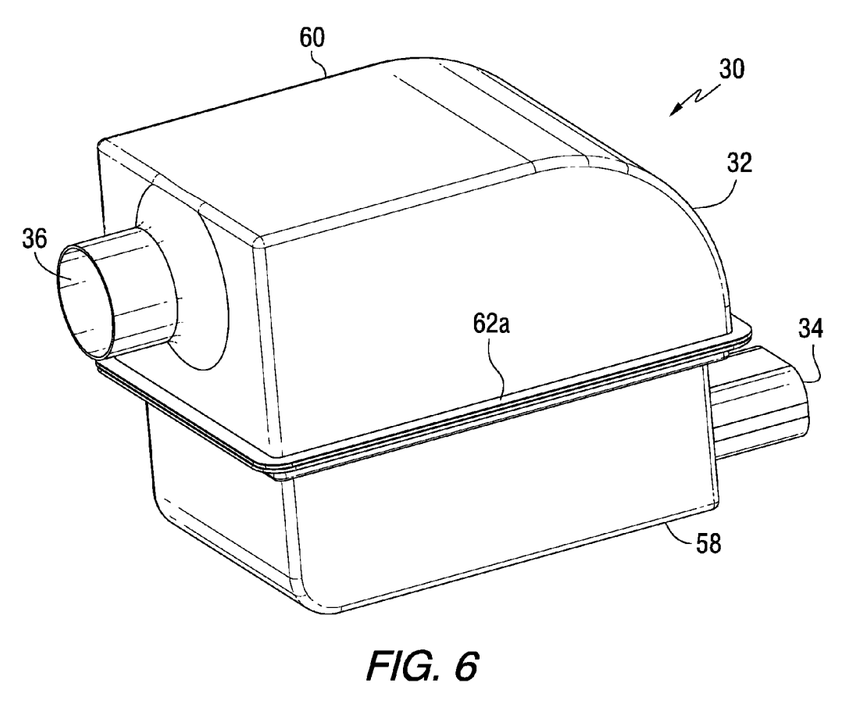
FIG. 6 is like FIG. 1 and shows another embodiment.
Figure 8:
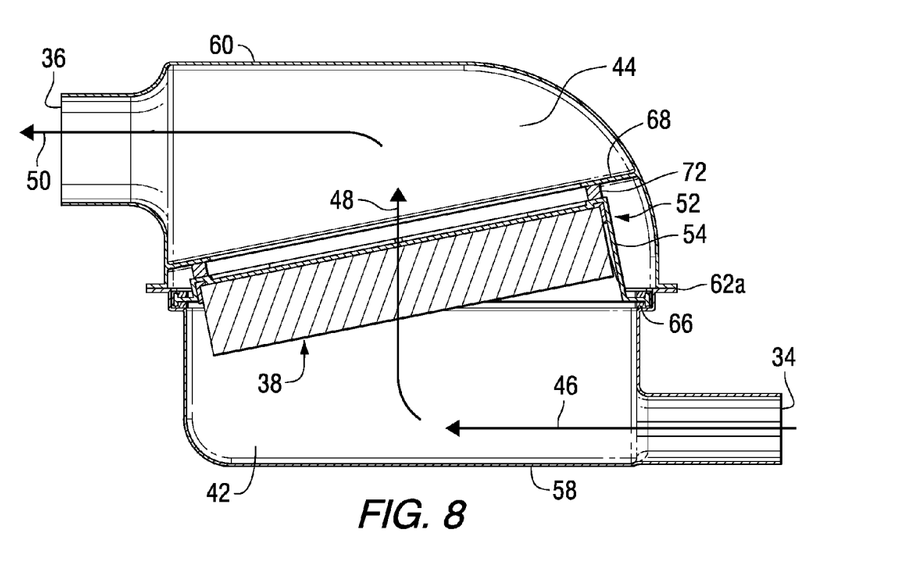
FIG. 8 is a sectional view of the filter assembly of FIG. 6.
Figure 9:
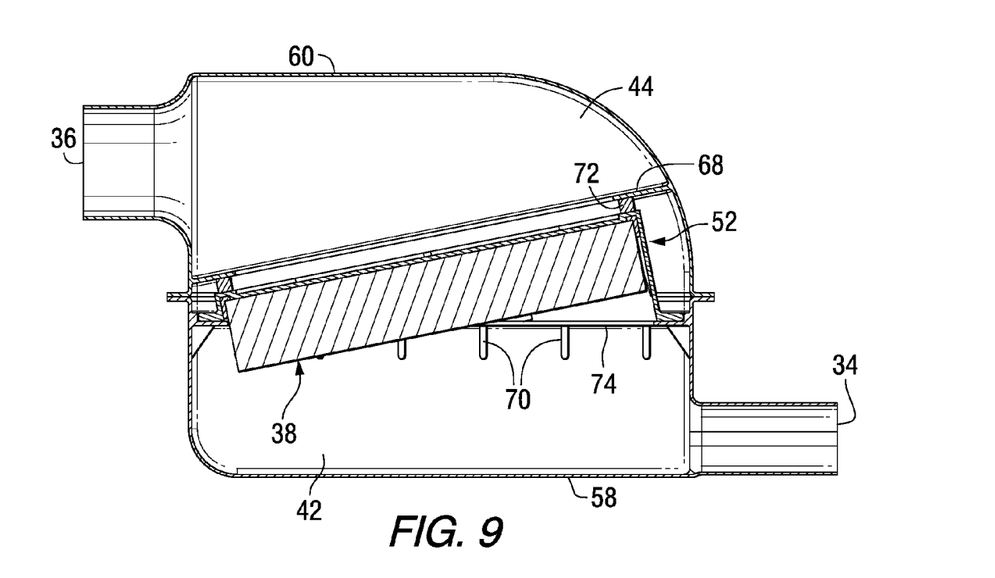
FIG. 9 is like FIG. 8 and shows another embodiment.
Figure 10:
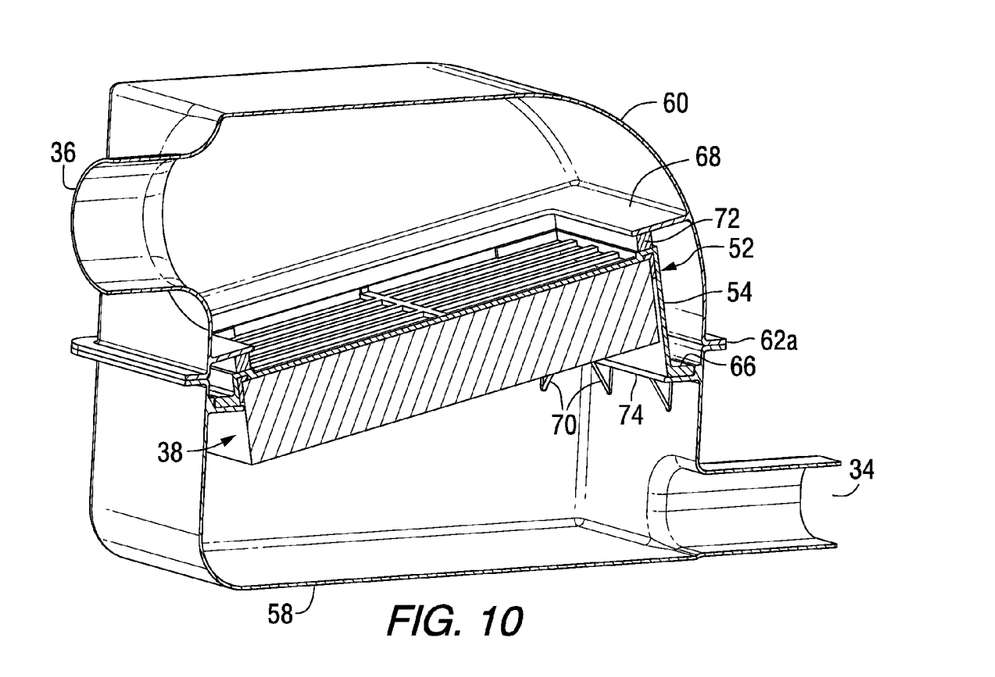
FIG. 10 is an isometric view of the embodiment of FIG. 9.

Housing 32 includes a base 58 and a cover 60 meeting at an interface split line 62, FIG. 1. In one embodiment, border frame 52 of panel filter element 38 has a mounting gasket or flange 64, FIG. 4, mounting the panel filter element to the housing at split line 62, e.g. by being sandwiched between complemental flanges on the housing base and cover, and sealing outlet plenum 44 from inlet plenum 42. In FIGS. 1-3, interface split line 62 and panel filter element 38 extend obliquely relative to the noted axial direction 46 and/or 50. In FIGS. 6-8, interface split line 62a extends parallel to the noted axial direction 46 and/or 50, and panel filter element 38 extends obliquely relative to the noted axial direction. In FIGS. 1-3, the split line and the panel filter element may extend in parallel or non-parallel relation to each other. In FIGS. 6-8, the split line and the panel filter element extend in non-parallel relation to each other.

In FIGS. 6-10, each of base 58 and cover 60 has a respective set of shelves 66 and 68 engaging and trapping border frame 52 of the panel filter element in mounted and sealed relation therebetween. At least one of the shelves, e.g. shelf 68, FIGS. 7-10, is transversely spaced from the noted split line 62a. In one embodiment, the shelves include transversely extending ribs, e.g. ribs 70 formed in base 58, engaging and supporting border frame 52. A given set of shoulders such as shoulder 68 on cover 60 extend parallel to the panel filter element and engage border frame 52 in sealing relation, e.g. at gasket 72. Another given set of shelves such as 74 of base 58 extend obliquely relative to the panel filter element and engage border frame 52 at the lower edge thereof in sealing relation.

Figure 11:
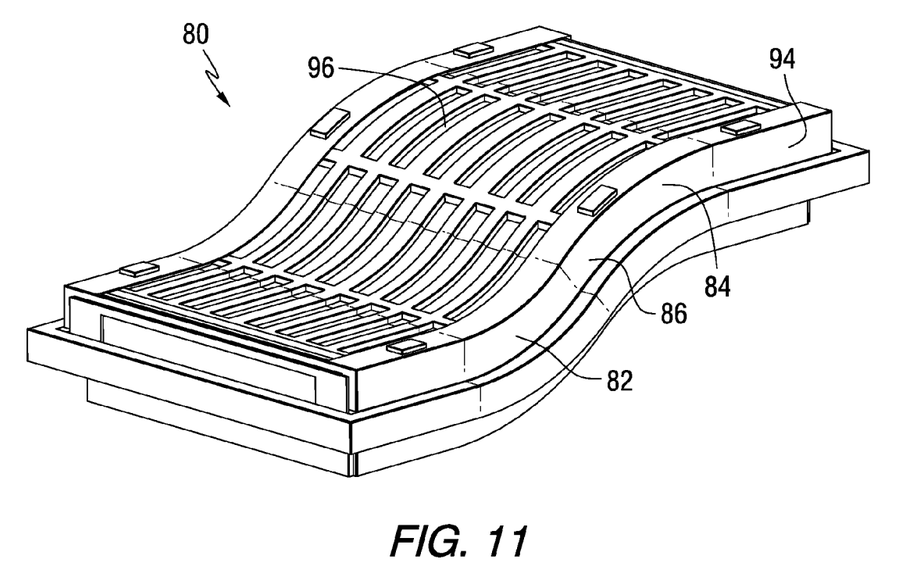
FIG. 11 is like FIG. 4 and shows another embodiment.
Figure 12:
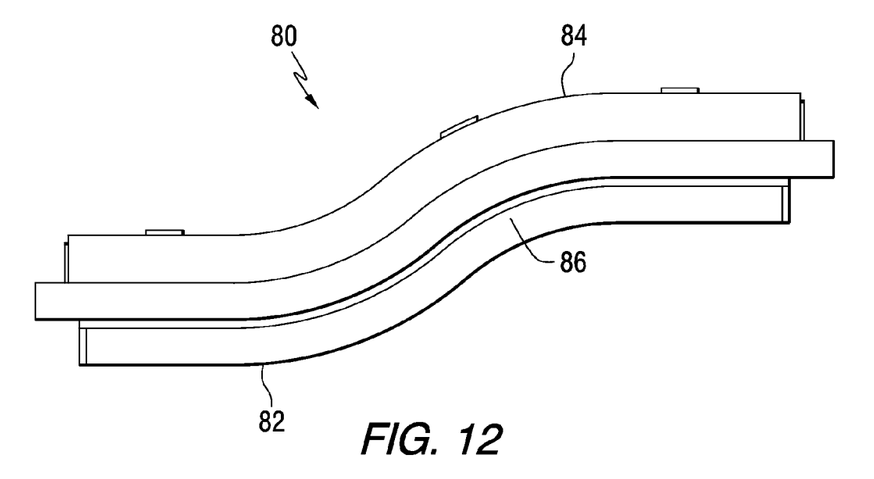
FIG. 12 is a side view showing the panel filter element assembly of FIG. 11.
Figure 13:
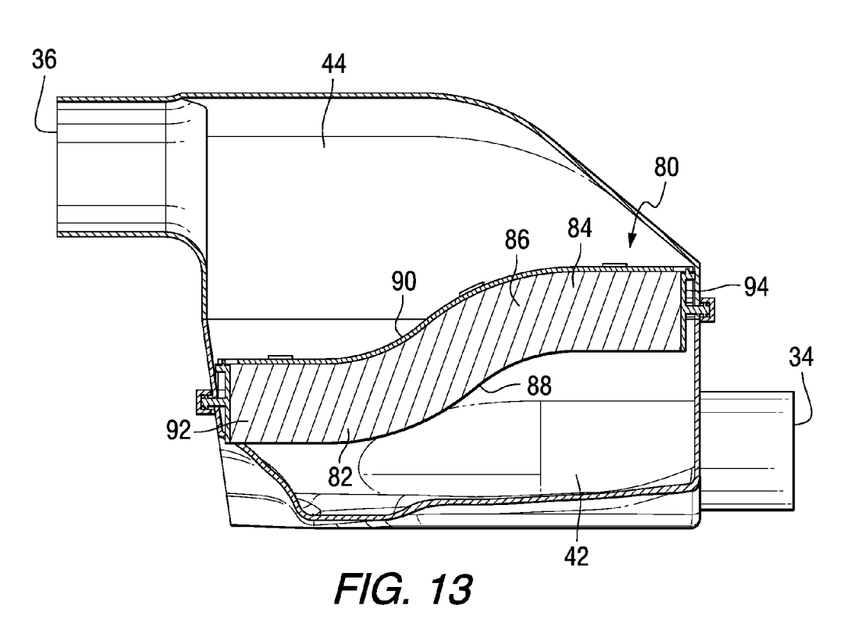
FIG. 13 is a sectional view showing the panel filter element assembly of FIG. 11 mounted in a housing.
Figure 14:
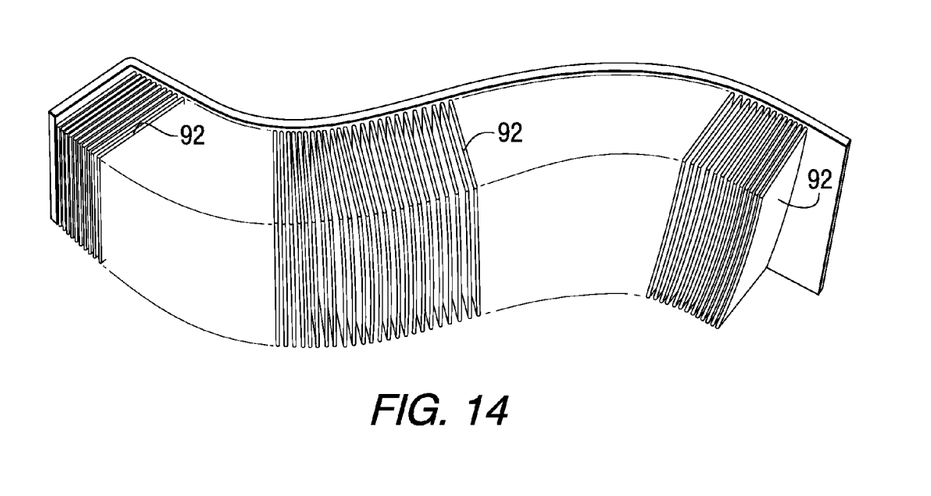
FIG. 14 is an isometric view of another panel filter element in accordance with the invention.

In FIGS. 1-10, the panel filter element 38 is rectiplanar, i.e. lies in a single two-dimensional plane which is rectilinear in each of such two dimensions. In further embodiments, the panel filter element is non-rectiplanar, for example as shown in FIGS. 11-21, where like reference numerals are used from above where appropriate to facilitate understanding. In FIGS. 11-13, panel filter element 80 has at least one curved section 82, and in a further embodiment at least two curved sections 82, 84, and in a further embodiment is S-shaped and has a transition section 86, between two curved sections 82 and 84, with the transition section 86 having an upstream face 88 facing inlet 34 across inlet plenum 42, and a downstream face 90 facing outlet 36 across outlet plenum 44. The panel filter element includes filter media 92 which may take various forms as known, including pleated filter media as shown in FIG. 14.

Figure 15:
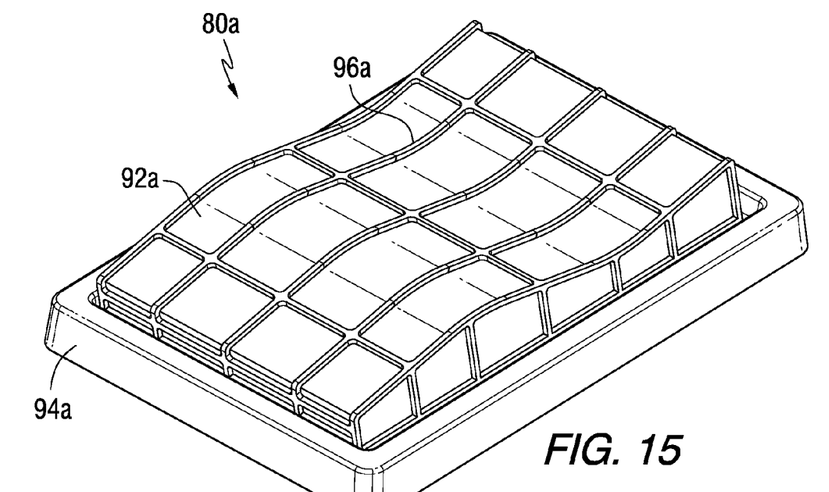
FIG. 15 is like FIG. 11 and shows another embodiment.
Figure 16:
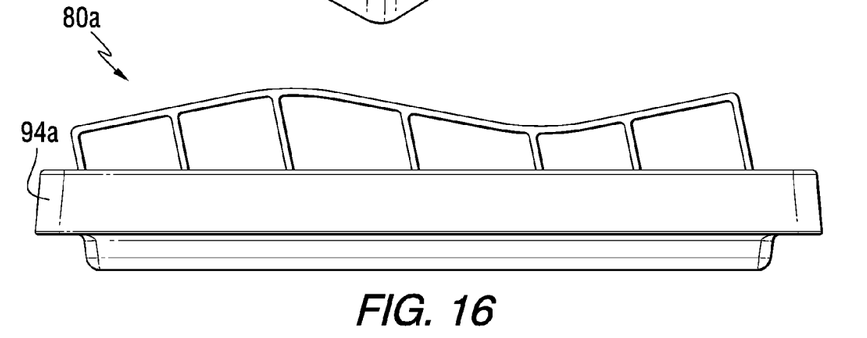
FIG. 16 is a side view of the panel filter element assembly of FIG. 15.
Figure 17:
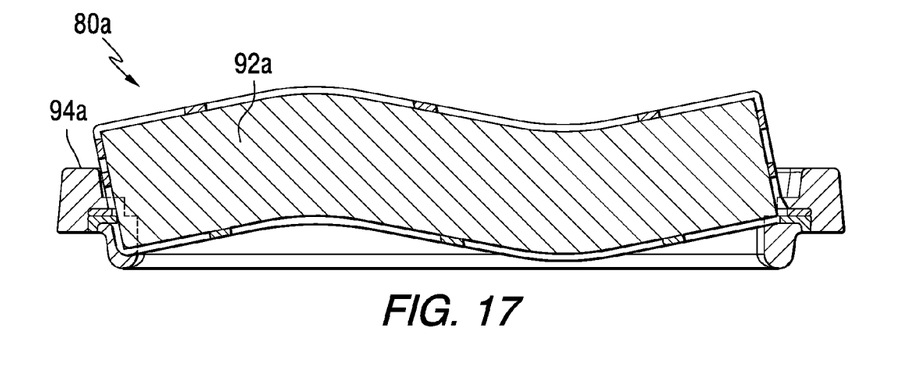
FIG. 17 is a sectional view of the panel filter element assembly of FIG. 15.
Figure 18:
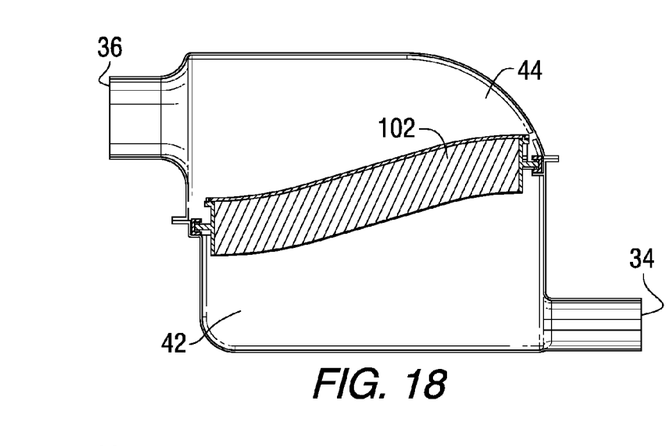
FIG. 18 is a sectional schematic view of an alternate embodiment of a panel filter element assembly mounted in a housing.
Figure 19:
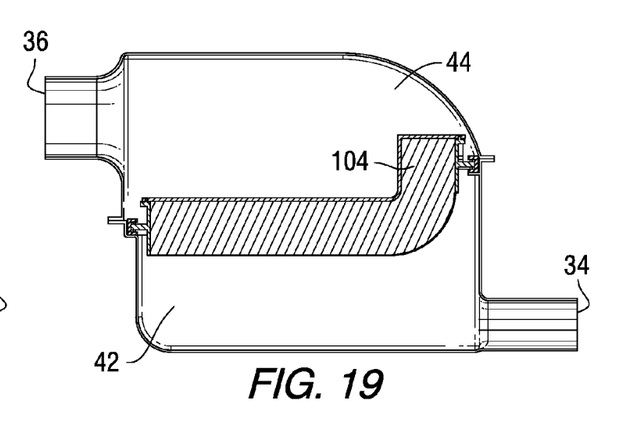
FIG. 19 is like FIG. 18 and shows another embodiment.
Figure 20:
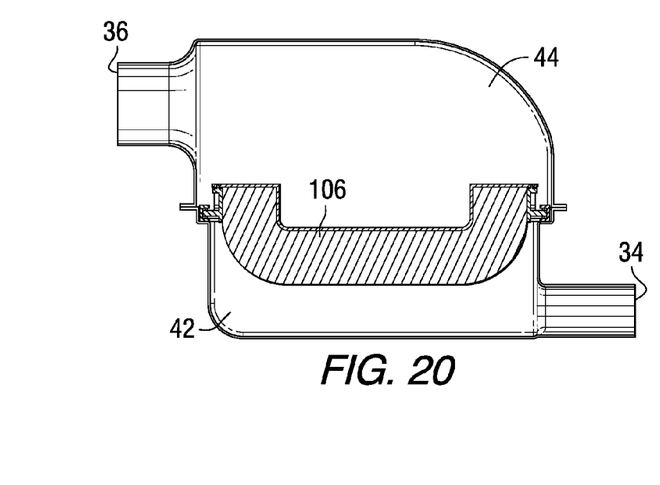
FIG. 20 is like FIG. 18 and shows another embodiment.
Figure 21:
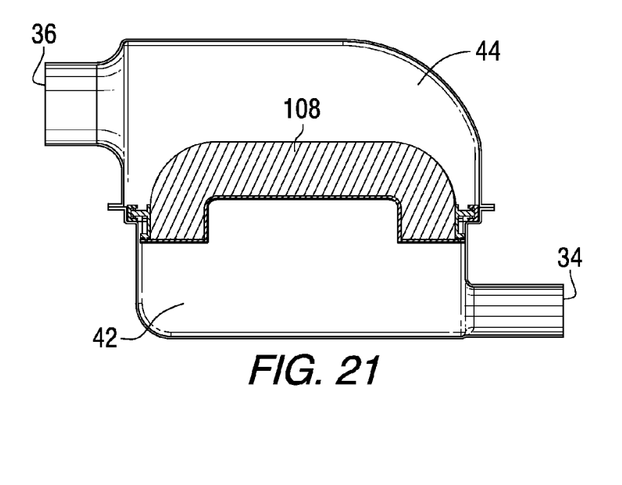
FIG. 21 is like FIG. 18 and shows another embodiment.

The panel filter element, 38, FIGS. 1-10, 80, FIGS. 11-14, 80a, FIGS. 15-17, includes filter media 40, 92, 92a having a border frame 52, 94, 94a configured to mount the panel filter element 38, 80, 80a in an orientation reducing incoming flow resistance to and also outgoing flow resistance from the panel filter element. In FIGS. 1-10, the filter media and the border frame extend along respective first and second planes obliquely relative to each other. In FIGS. 11-13, the filter media and the border frame extend parallel to each other, and in one embodiment in a non-rectilinear S-shape. In FIGS. 15-17, the filter media extends along a wave shape in the border frame, and in one embodiment in an S-shape in a rectiplanar border frame. In one embodiment, the filter media is rectiplanar, FIGS. 1-10. In another embodiment, the border frame is rectiplanar, FIGS. 1-10, 15-17. In another embodiment, the filter media is non-rectiplanar, FIGS. 11-21. In another embodiment, the border frame is non-rectiplanar, FIGS. 11-13. A lattice-work cage 96, FIG. 11, 96a, FIG. 15, may be supported by the border frame and envelop filter media 92, 92a. The cage may be non-rectiplanar and conformingly shape the filter media to be non-rectiplanar. FIGS. 18-21 show further embodiments of panel filter elements 102, 104, 106, 108, respectively, for enhancing void space in inlet plenum 42 at inlet 34 and/or in outlet plenum 44 at outlet 36, to reduce inlet flow restriction from inlet 34 into inlet plenum 42 and reduce outlet flow restriction from outlet plenum 44 to outlet 36.

The present system provides a method for servicing a filter having a filter housing with a mating base and cover defining a filter chamber retaining a panel filter element when the base and cover are mated to each other. The panel filter element filters fluid flowing from a housing inlet to a housing outlet. The panel filter element divides the filter chamber into an inlet plenum and an outlet plenum, with the panel filter element being configured to a) reduce inlet flow restriction from the inlet into the inlet plenum and b) reduce outlet flow restriction from the outlet plenum to the outlet. The method includes providing the panel filter element and at least a selected one of the cover and the base with respective complemental first and second configurations, and disabling mating of the base and the cover to each other with the panel filter element in place unless a panel filter element is selected having the noted first configuration complementally interacting with the noted second configuration. The method includes providing the base and the cover meeting at an interface split line, providing the panel filter element with a border frame mounting the panel filter element to the housing at the split line and sealing the outlet plenum from the inlet plenum, providing the border frame with the first configuration, and providing the split line with the second configuration. In a further embodiment, wherein fluid flows transversely through the panel filter element from the inlet plenum to the outlet plenum, the method includes providing the base and the cover meeting at an interface split line, providing the panel filter element with a border frame mounting and sealing the panel filter element in the housing, providing each of the base and the cover with a respective set of shelves, engaging and trapping the border frame in mounted and sealed relation between the shelves, and providing at least one of the shells transversely spaced from the noted split line. In a further embodiment, the method includes providing some of the shelves as transversely extending ribs, and engaging and supporting the border frame with the ribs. In a further embodiment, the method includes providing a given set of shelves extending parallel to the panel filter element and engaging the border frame in sealing relation. In a further embodiment, the method includes providing a first given set of shelves extending parallel to the panel filter element and engaging the border frame in sealing relation, and providing a second given set of shelves extending obliquely relative to the panel filter element and engaging the border frame in sealing relation.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A filter assembly comprising a housing having an inlet and an outlet, a panel filter element in said housing for filtering fluid flowing from said inlet to said outlet, said panel filter element dividing said housing into an inlet plenum and an outlet plenum, said panel filter element being configured to: a) reduce inlet flow restriction from said inlet, to said inlet plenum; and b) reduce outlet flow restriction from said outlet plenum to said outlet, wherein fluid flows along an axial direction in at least one of said inlet and outlet plenums, and flows transversely through said panel filter element from said inlet plenum to said outlet plenum, said inlet plenum and said outlet plenum are transversely spaced on opposite sides of said panel filter element therebetween, wherein said panel filter element extends obliquely relative to said axial direction, and wherein the volume of said inlet plenum increases as fluid progresses away from said inlet, and the volume of said outlet plenum decreases as fluid progresses towards said outlet.

2. The filter assembly accordingly to claim 1 wherein said housing comprises a base and a cover meeting, at an interface split line, and said panel filter element has a border frame with a mounting flange mounting said panel filter element to said housing at said split line and sealing said outlet plenum from said inlet plenum.

3. The filter assembly according to claim 1 wherein said panel filter element is rectiplanar.

4. The filter assembly according to claim 1 wherein said panel filter element is non-rectiplanar.

5. The filter assembly according to claim 4 wherein said panel filter element has at least one curved section.

6. The filter assembly according to claim 5 wherein said panel filter element has at least two curved sections.

7. The filter assembly according to claim 1 wherein said panel filter element is S-shaped and has a transition section between two curved sections, said transition section having an upstream face facing said inlet across said inlet plenum, and a downstream face facing said outlet across said outlet plenum.

8. A filter assembly comprising a housing having an inlet and an outlet, a panel filter element in said housing for filtering fluid flowing from said inlet to said outlet, said panel filter element dividing said housing into an inlet plenum and an outlet plenum, said panel filter element being configured to: a) reduce inlet flow restriction from said inlet to said inlet plenum; and b) reduce outlet flow restriction from said outlet plenum to said outlet, wherein said panel filter element has a border frame having distally opposite first and second endwalls, said first endwall being proximate said inlet, said second endwall being proximate said outlet, each said endwall having a height extending along the direction of fluid flow through said panel filter element, wherein the height of said first endwall is different than the height of said second endwall.

9. The filter assembly according to claim 8 wherein the height of said first endwall is greater than the height of said second endwall.

10. The filter assembly according to claim 8 wherein said panel filter element has a height along the direction of fluid flow therethrough, and wherein the height of one of said first and second endwalls is greater than the height of said panel filter element, and the height of the other of said first and second endwalls is less than the height of said panel filter element.

11. A filter assembly comprising a housing having an inlet and an outlet, a panel filter element in said housing for filtering fluid flowing from said inlet to said outlet, said panel filter element dividing said housing into an inlet plenum and an outlet plenum, said panel filter element being configured to: a) reduce inlet flow restriction from said inlet to said inlet plenum; and b) reduce outlet flow restriction from said outlet plenum to said outlet, wherein fluid flows along an axial direction in at least one of said inlet and outlet plenums, and flows transversely through said panel filter element from said inlet plenum to said outlet plenum, said inlet plenum and said outlet plenum are transversely spaced on opposite sides of said panel filter element therebetween, and wherein said housing comprises a base and a cover meeting at an interface split line, and wherein at least one of said split line and said panel filter element extends obliquely relative to said axial direction, wherein said split line extends parallel to said axial direction, and said panel filter element extends obliquely relative to said axial direction.

12. A filter assembly comprising a housing having an inlet and an outlet, a panel filter element in said housing for filtering fluid flowing from said inlet to said outlet, said panel filter element dividing said housing into an inlet plenum and an outlet plenum, said panel filter element being configured to: a) reduce inlet flow restriction from said inlet to said inlet plenum; and b) reduce outlet flow restriction from said outlet plenum to said outlet, wherein fluid flows along an axial direction in at least one of said inlet and outlet plenums, and flows transversely through said panel filter element from said inlet plenum to said outlet plenum said inlet plenum and said outlet plenum are transversely spaced on opposite sides of said panel filter element therebetween, and wherein said housing comprises a base and a cover meeting at an interface split line, and wherein at least one of said split line and said panel filter element extends obliquely relative to said axial direction, wherein said split line and said panel filter element extend in non-parallel relation to each other.

13. A filter assembly comprising a housing having an inlet and an outlet, a panel filter element in said housing for filtering fluid flowing from said inlet to said outlet, said panel filter element dividing said housing into an inlet plenum and an outlet plenum, said panel filter element being configured to: a) reduce inlet flow restriction from said inlet to said inlet plenum; and b) reduce outlet flow restriction from said outlet plenum to said outlet, wherein fluid flows transversely through said panel filter element from said inlet plenum to said outlet plenum, said housing comprises a base and a cover meeting at an interface split line, said panel filter element has a border frame for mounting and sealing said panel filter element in said housing, each of said base and said cover has a respective set of shelves engaging and trapping said border frame in mounted and sealed relation therebetween at least one of said shelves being transversely spaced from said split line.

14. The filter assembly according to claim 13 wherein said shelves include transversely extending ribs engaging and supporting said border frame.

15. The filter assembly according to claim 13 wherein a given set of said shelves extend parallel to said panel filter element and engage said border frame in sealing relation.

16. The filter assembly according to claim 13 wherein a first given set of said shelves extend parallel to said panel filter element and engage said border frame in sealing relation, and a second given set of said shelves extend obliquely relative to said panel filter element and engage said border frame in sealing relation.

17. The filter assembly according to claim 13 wherein a first given set of said shelves extend parallel to said panel filter element and engage said border frame in sealing relation, and a second given set of said shelves extend obliquely relative to said panel filter element and engage said border frame in sealing relation, and a third given set of said shelves comprise transversely extending ribs engaging and supporting said border frame.

* * * * *